United States Patent [19]

Copple

[11] Patent Number: 4,591,180
[45] Date of Patent: May 27, 1986

[54] PORTABLE BICYCLE STAND

[76] Inventor: Rebecca Copple, 4927 Walker Ave., #1, Lincoln, Nebr. 68504

[21] Appl. No.: 694,109

[22] Filed: Jan. 23, 1985

[51] Int. Cl.⁴ .............................................. B62H 1/00
[52] U.S. Cl. .................................................... 280/293
[58] Field of Search .............. 280/293, 294, 295, 296, 280/297, 301, 302, 303

[56] References Cited

U.S. PATENT DOCUMENTS

| | | | |
|---|---|---|---|
| 431,740 | 7/1890 | Curtis | 211/22 |
| 614,442 | 11/1898 | Campau | 280/294 |
| 1,227,390 | 5/1917 | Cook | 280/293 |
| 3,425,713 | 2/1969 | McCauley | 280/301 |
| 3,652,105 | 3/1972 | Humlong | 280/301 |
| 3,712,637 | 1/1973 | Townsend | 280/293 |
| 3,931,991 | 1/1976 | Marchello | 280/295 |
| 3,980,320 | 9/1976 | Marchello | 280/293 |

FOREIGN PATENT DOCUMENTS

| | | | |
|---|---|---|---|
| 697411 | 9/1940 | Fed. Rep. of Germany | 280/293 |
| 13841 | of 1895 | United Kingdom | 280/294 |

OTHER PUBLICATIONS

Photograph of Bike Stand Used for Bike Display Purposes in Bike Stores.

*Primary Examiner*—John A. Pekar
*Assistant Examiner*—Everett G. Diederiks, Jr.
*Attorney, Agent, or Firm*—Kinney & Lange

[57] ABSTRACT

A portable bicycle stand for supporting a bicycle in an upright position is designed to permit its removal from the bicycle when not in use. The bicycle stand includes an elongated support leg having at a first end a cooperating finger and thumb adapted to detachably mount the support leg to the bicycle frame in a first support position wherein a second opposite end of the support leg engages the ground to support the bicycle in a generally upright orientation. Intermediate its first and second ends, the support leg further has a pair of aligned arms which, in cooperation with the support leg itself, are adapted to detachably mount the support leg on the bicycle frame in a second storage position.

5 Claims, 4 Drawing Figures

PORTABLE BICYCLE STAND

BACKGROUND OF THE INVENTION

1. Field of the Invention

The present invention relates generally to a bicycle stand for supporting a bicycle in an upright position which may be removed from or carried by the bicycle frame when the bicycle is being ridden.

2. Description of the Prior Art

Many varieties of bicycle stands have been developed for securing a bicycle in an upright position relative to the ground. U.S. Pat. No. 1,227,390 to Cook describes a bicycle support having a first end arranged to be hooked on the bicycle frame between two spaced, rearwardly extending forks supporting the rear wheel of the bicycle. A second, oppositely disposed end of the support engages the ground to support the bicycle in an upright position. Mounting clips attached to the bicycle frame are required to store the bicycle stand when the bicycle is being ridden.

U.S. Pat. No. 3,425,713 to McCauley and U.S. Pat. No. 3,652,105 to Humlong disclose retractable bicycle stands which are bolted to the bicycle frame. The Humlong bicycle stand is designed to be mounted on a single tubular frame member extending from the bicycle pedal crank hub. Both Humlong and McCauley require an extended frame, so that space is provided for mounting the kickstands.

U.S. Pat. No. 431,740 to Curtis describes a bicycle stand for storing a bicycle in an upright position. Curtis describes the use of a pair of braces which aid in supporting the bicycle on a friction roller. There is no suggestion or indication that a single brace could be used to support a bicycle in an upright position.

U.S. Pat. No. 3,980,320 to Marchello, U.S. Pat. No. 3,931,991 to Marchello and U.S. Pat. No. 3,712,637 to Townsend show detachable support stands designed primarily for use in servicing a bicycle. There is no indication that any of these devices can be carried by a bicycle in a storage position when the bicycle is being ridden.

Many lightweight bicycles presently being sold are not provided with built-in or clamped-on kickstands. If standard bicycle kickstands were secured on such a bicycle (typically, such kickstands are secured to the chain stays of a bicycle frame immediately behind the pedal crank hub), the performance of the bicycle may be hampered. This can occur because the bicycle becomes unbalanced by the kickstand's weight or because the securing of the kickstand to the chain stays alters the effective lengths of the chain stays by securing them together prior to the pedal crank hub.

SUMMARY OF THE INVENTION

The present invention is a portable and removable bicycle stand for supporting a bicycle in an upright position relative to the ground. The bicycle stand includes an elongated support leg which has first and second means thereon for detachably mounting the support leg on a frame of the bicycle in two different positions: a support position and a storage position. When the support leg is mounted on the frame by the first means, the support leg extends from the bicycle frame to the ground to support the bicycle in a generally upright position relative to the ground. When the support leg is mounted on the frame by the second means, the support leg is carried by the bicycle in an out-of-the-way storage location, permitting the bicycle to be ridden without interference from the bicycle stand.

DETAILED DESCRIPTION OF THE PREFERRED EMBODIMENTS

Figure 1:
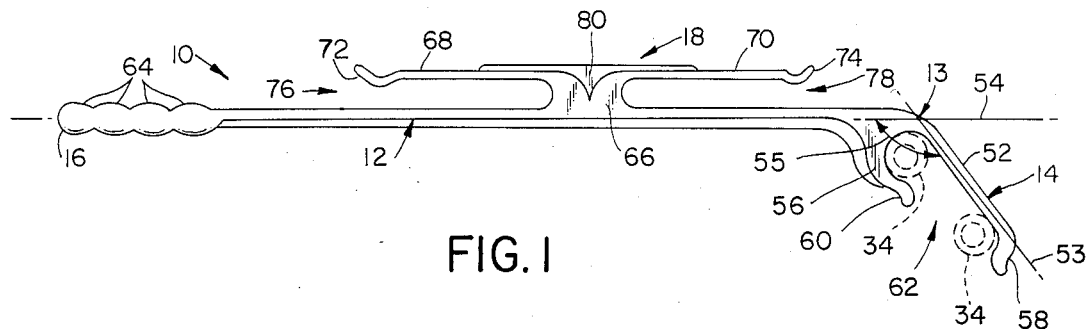
FIG. 1 is a side elevational view of the bicycle stand of the present invention.
Figure 2:
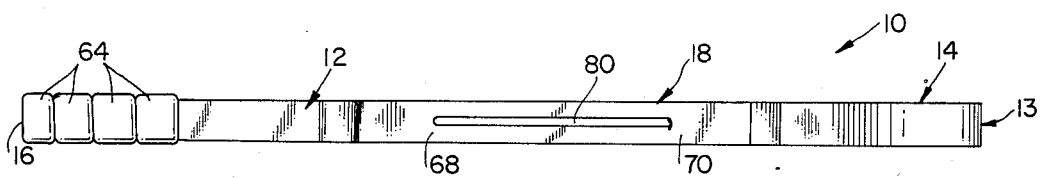
FIG. 2 is a top plan view of the bicycle stand of the present invention.
Figure 4:
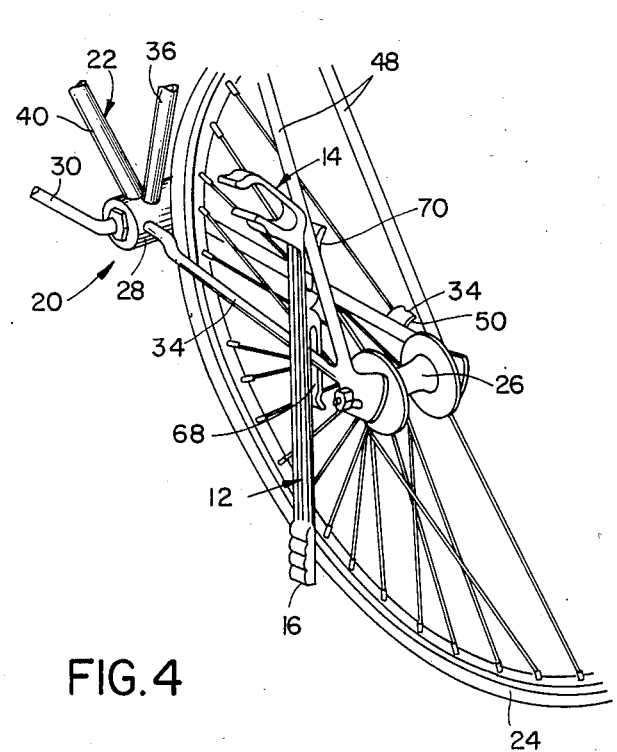
FIG. 4 is a pictorial view which illustrates the orientation of the bicycle stand when mounted in a storage position on the frame of a bicycle.
Figure 3:
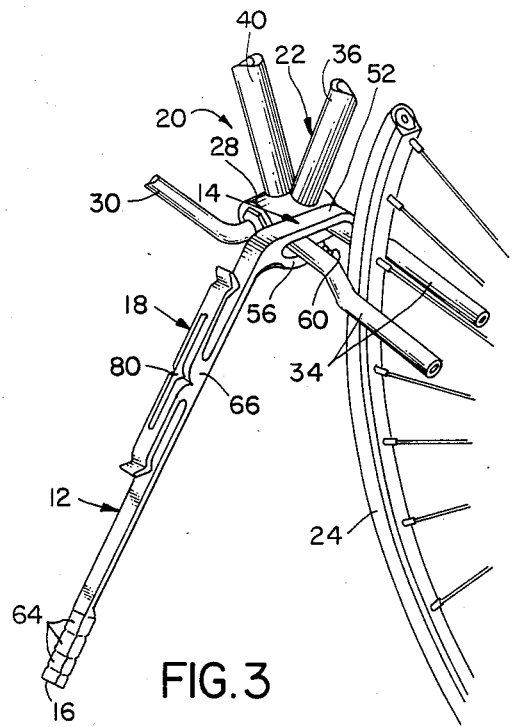
FIG. 3 is a pictorial view which illustrates the orientation of the bicycle stand when engaging the frame of a bicycle to support the bicycle in an upright position.

A portable bicycle stand of the present invention is generally indicated at 10 in FIGS. 1 and 2. Bicycle stand 10 includes an elongated support leg 12 carrying at a first end 13 a first means 14 for detachably mounting support leg 12 on a frame of a bicycle. Oppositely disposed from the first means 14 is a second or ground engaging end 16. A second means 18 for detachably mounting support leg 12 on the bicycle frame is defined intermediate the first end 13 and ground engaging end 16 of support leg 12. Leg support 12 may be selectively mounted on the bicycle frame by the first means 14 or second means 18. When mounted to the bicycle frame by the first means 14 as illustrated in FIG. 3, the support leg extends from the bicycle frame to the ground to support the bicycle in a generally upright position. When mounted to the bicycle frame by the second means 18 as illustrated in FIG. 4, the support leg 12 is carried by the bicycle in an out-of-the-way location for transport and storage. The unique configuration and position of the first means 14 and second means 16 allows bicycle stand 10 to be used with most conventional bicycles.

As illustrated in FIGS. 3 and 4, a conventional bicycle 20 typically includes a frame 22 to which a rear wheel 24 is rotatably mounted by its axle 26 to the frame 22. The bicycle frame 22 includes a pedal crank hub 28 on which a pedal crank arm 30 is rotatably mounted. Extending rearwardly from the pedal crank hub 28 are a pair of spaced apart tubular chain stays 34 which engage rear wheel 24 at its axle 26. Extending substantially upwardly from pedal crank hub 28 is a seat tube 36 on which a seat (not shown) is mounted.

A "down tube" 40 extends upwardly and forwardly of pedal crank hub 28 to support a handle bar and front wheel assembly (not shown). Extending downwardly from an upper end of seat tube 36 to rear wheel axle 26 are a pair of tubular seat stays 48. Seat stays 48 are typically acutely angled with respect to chain stays 34, as indicated at 50.

First means 14 of bicycle support 10 is particularly configured to selectively engage both chain stays 34 adjacent the pedal crank hub 28. As shown in FIG. 1, first means 14 includes a resilient finger 52 (which defines a finger axis 53) obtusely angled with respect to a longitudinal axis 54 defined by elongated support leg 12, as shown at 55. A resilient thumb 56, substantially shorter than finger 52, also extends from support leg 12 in substantially parallel alignment with finger 52. Finger 52 and thumb 56 have terminal ends 58 and 60, respectively, each configured to wrap around an outer portion of one of the chain stays 34 which are illustrated in phantom cross-section in FIG. 1.

A recess 62 defined between finger 52 and thumb 56 is arranged to receive, in cross section, chain stays 34 adjacent the pedal crank hub 28, as illustrated in FIGS. 1 and 3. Resilient finger 52 and resilient thumb 56 spread apart slightly when support leg 12 is mounted to the chain stays 34 by first means 14, and affirmatively grasp the chain stays 34 therebetween. Terminal ends 58 and 60 of the finger 52 and thumb 56, respectively, curve inwardly toward one another to assure that chain stays 34 remain within recess 62 until a disengaging force is applied to bicycle stand 10 to remove it from the bicycle frame 22.

It is preferred that finger 52 and thumb 56 be disposed at an angle of about 135° with respect to longitudinal axis 54 of support leg 12, as shown at 55 in FIG. 1. This 135° divergence between the members of first means 14 and the longitudinal axis 54 of support leg 12 permits the bicycle 20 to tilt slightly to one side when supported on the bicycle stand 10.

When mounted by the first means 14 as illustrated in FIG. 1, support leg 12 extends from the bicycle frame 22 to the ground. Ground engaging end 16 includes a plurality of detachable sections 64 which may be cut off as necessary to "size" the bicycle stand 10 for use with bicycles of various sizes. In its original condition, support leg 12 is approximately 17½ inches long and one inch in diameter. When so dimensioned, bicycle stand 10 is sized to support most larger bicycles in a stationary support orientation.

Second means 18 of the bicycle support 10 is longitudinally offset from first means 14 with respect to longitudinal axis 54 of support leg 12. The second means 18 extends in a generally opposite direction away from support leg 12 than first means 14. In this configuration, support leg 12 may be mounted to the bicycle frame 22 by either first means 14 or second means 18, without interference from the other. Second means 18 includes a laterally extending stub or base 66 which supports a pair of substantially aligned and oppositely extending resilient support arms 68 and 70. Support arms 68 and 70 extend substantially parallel to longitudinal axis 54 of support leg 12. Arms 68 and 70 also have terminal ends 72 and 74, respectively, which are curved inwardly toward support leg 12. Arms 68 and 70 define s second recess 76 (between arm 68 and support leg 12) and an oppositely facing third recess 78 (between arm 70 and support leg 12), as shown in FIG. 1, which are dimensioned to coincidentally receive portions of chain stay 34 and seat stay 48 located on one side of bicycle frame 22 substantially adjacent rear wheel axle 26. Chain stay 34 is grasped between arm 68 and support leg 12 and seat stay 48 is grasped between arm 70 and support leg 12, as shown in FIG. 4.

When support leg 12 is so secured onto the bicycle frame 22, bicycle stand 10 is preferably disposed with support leg 12 in a substantially vertical position, with its ground engaging end 16 extending towards the ground. In this position, the stand 10 is securely disposed in an out-of-the-way storage and transport position so as not to interfere with the operation of the bicycle when ridden. Bicycle stand 10, if desired, can be removed altogether and carried by the bicycle operator.

Resilient arms 68 and 70 extend for a length sufficient to assure engagement with a seat stay 48 and chain stay 34. A rigid bar 80 is fixed to a side of the arms opposite the stub 66 as illustrated in FIGS. 1 and 2 to ensure that the arms 68 and 70 have sufficient strength at their terminal ends 72 and 74 to support the bicycle stand 10 on the frame 22. Bar 80 provides some rigidity to the arms 68 and 70 adjacent base 66 to enhance the overall grasping ability of the arms 68 and 70. The inward curvature of the terminal ends of the arms hold the chain stay 34 and seat stay 48 within recesses 76 and 78 until a disengagement force is applied to bicycle stand 10.

It is preferred that first means 14, second means 18 and support leg 12 be of integral construction, which will significantly reduce the cost of manufacturing the stand. The entire bicycle stand 10 could, for example, be formed from one piece of plastic. In addition, with the described configuration of bicycle stand 10, stand 10 may be attached to either side of frame 22 of bicycle 20 by either the first or the second means.

Although the present invention has been described with reference to preferred embodiments, workers skilled in the art will recognize that changes may be made in form and detail without departing from the spirit and scope of the invention.

What is claimed is:

1. A portable bicycle stand for supporting a bicycle having a frame in an upright position, the bicycle stand comprising:

an elongated support leg which defines a longitudinal axis;

first means carried by the support leg for detachably mounting the support leg on a frame of a bicycle in a support position such that the support leg extends from the frame to engage the ground and support the bicycle in an upright position relative to the ground, the first means including a cooperating finger and thumb extending from a first end of the support leg and defining a recess therebetween configured to receive, in releasable locking engagement, portions of the frame of the bicycle, such that a second end of the support leg is directed downwardly from the frame into engagement with the ground, the finger and thumb being constructed of resilient material and obtusely disposed with respect to the support leg longitudinal axis and the finger and thumb being substantially parallel with the thumb being shorter than the finger; and second means carried by the support leg for detachably mounting the support leg on the frame of the bicycle in a storage position such that the support leg is secured with respect to the frame of the bicycle in an out-of-the-way location for storage and transport.

2. The portable bicycle stand of claim 1 wherein the finger and thumb have terminal ends curved inward towards each other.

3. A portable bicycle stand for supporting a bicycle having a frame in an upright position, the bicycle stand comprising:

an elongated support leg;

first means carried by the support leg for detachably mounting the support leg on a frame of a bicycle in a support position such that the support leg extends from the frame to engage the ground and support the bicycle in an upright position relative to the ground; and second means carried by the support leg for detachably mounting the support leg on the frame of the bicycle in a storage position such that the support leg is secured with respect to the frame of the bicycle in an out-of-the-way location for storage and transport, the second means for detachably mounting including a pair of aligned and oppositely extending support arms, the support arms being disposed in substantially parallel alignment with the support leg to define a pair of recesses between the support arms and support leg configured to receive in releasable locking engagement, spaced portions of the bicycle frame.

4. A bicycle support stand for supporting in a substantially upright position, a bicycle of the type having a frame including a pair of chain stays extending forwardly from a rear wheel axle to a pedal crank hub, and a pair of seat stays extending upwardly and forwardly from the rear wheel axle, the bicycle support stand comprising:

an elongated support leg which defines a longitudinal axis and has at a first end first means for detachably mounting the support leg on the bicycle frame in a support position so that the support leg is directed downward from the frame to engage the ground with a second end wherein the first means for detachably mounting releasably engages the chain stays adjacent the pedal crank hub, and the elongated support leg further having, intermediate its first and second ends, second means for detachably mounting the support leg on the bicycle frame in a storage position wherein the second means for detachably mounting includes a pair of axially aligned, oppositely extending arms offset from and aligned substantially parallel with the longitudinal axis of the support leg to define a pair of oppositely facing recesses configured to receive in cross-section, a seat stay and a chain.

5. A portable bicycle stand for supporting a bicycle in a generally upright position relative to the ground, the bicycle being of the type having a frame which has a pair of chain stays extending forwardly from a rear wheel axle to a pedal crank hub and a pair of seat stays extending upwardly and forwardly from said rear wheel axle, the portable bicycle stand comprising:

an elongated support leg;

first means on the support leg adjacent a first end thereof for releasably engaging the pair of chain stays of the frame adjacent the pedal crank hub in a support position so that a second end of the support leg extends downward from the frame to engage the ground and support the bicycle in an upright position relative to the ground; and second means on the support leg intermediate the first and second ends thereof for releasably engaging one of the seat stays and one of the chain stays of the frame in a storage position so that the support leg is secured with respect to the frame in a storage and transport position.

* * * * *